April 6, 1965  J. W. ELDRED ETAL  3,176,821
ARTICLE CONVEYING AND TRANSFERRING MECHANISM
Filed Sept. 23, 1963  5 Sheets-Sheet 4
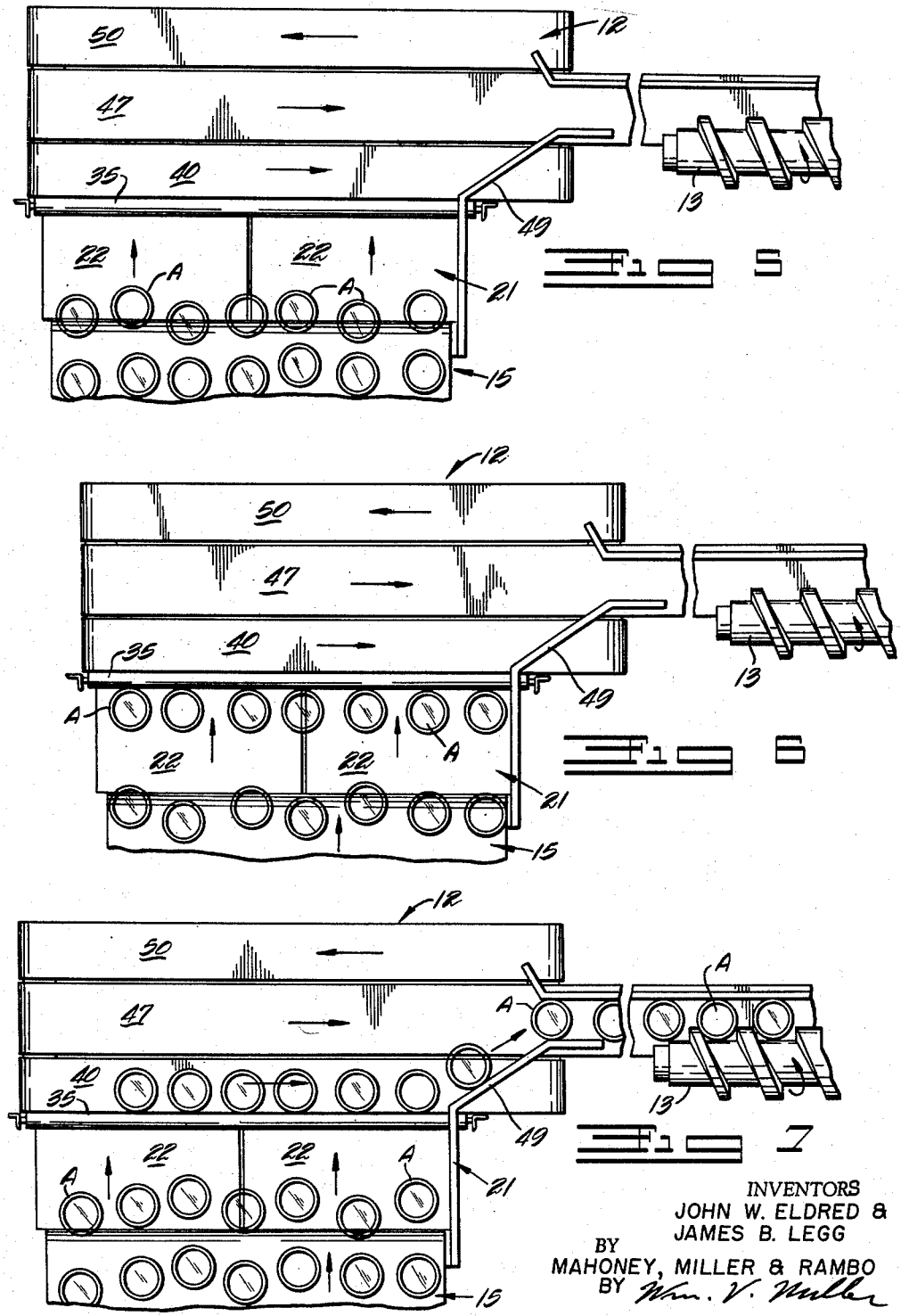
INVENTORS
JOHN W. ELDRED &
JAMES B. LEGG
BY
MAHONEY, MILLER & RAMBO
BY
ATTORNEYS April 6, 1965   J. W. ELDRED ETAL   3,176,821
ARTICLE CONVEYING AND TRANSFERRING MECHANISM
Filed Sept. 23, 1963   5 Sheets-Sheet 5
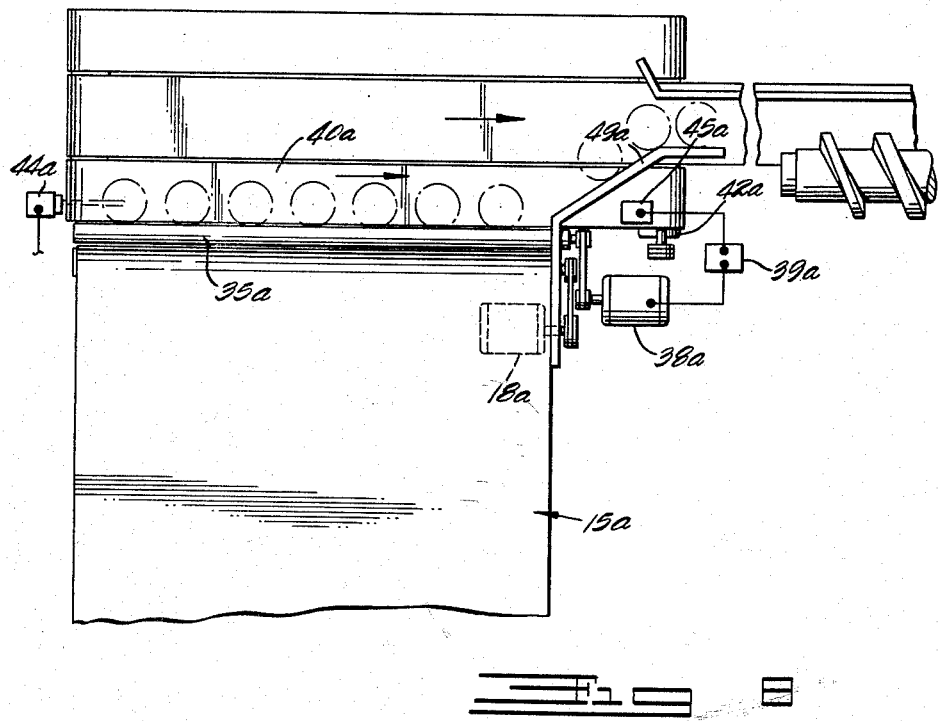
INVENTORS
JOHN W. ELDRED &
JAMES B. LEGG
BY MAHONEY, MILLER & RAMBO
BY
ATTORNEYS

United States Patent Office 3,176,821
Patented Apr. 6, 1965

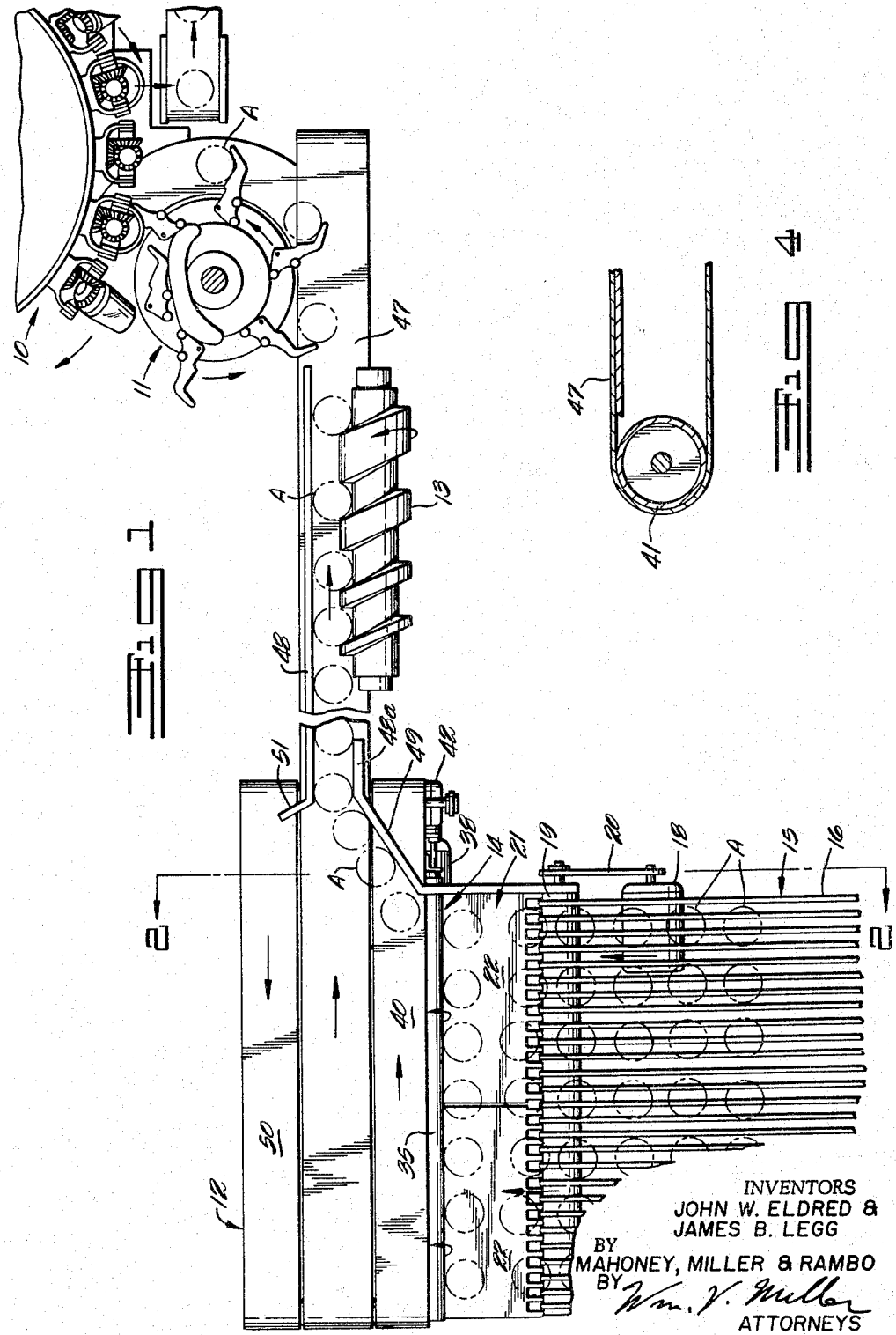

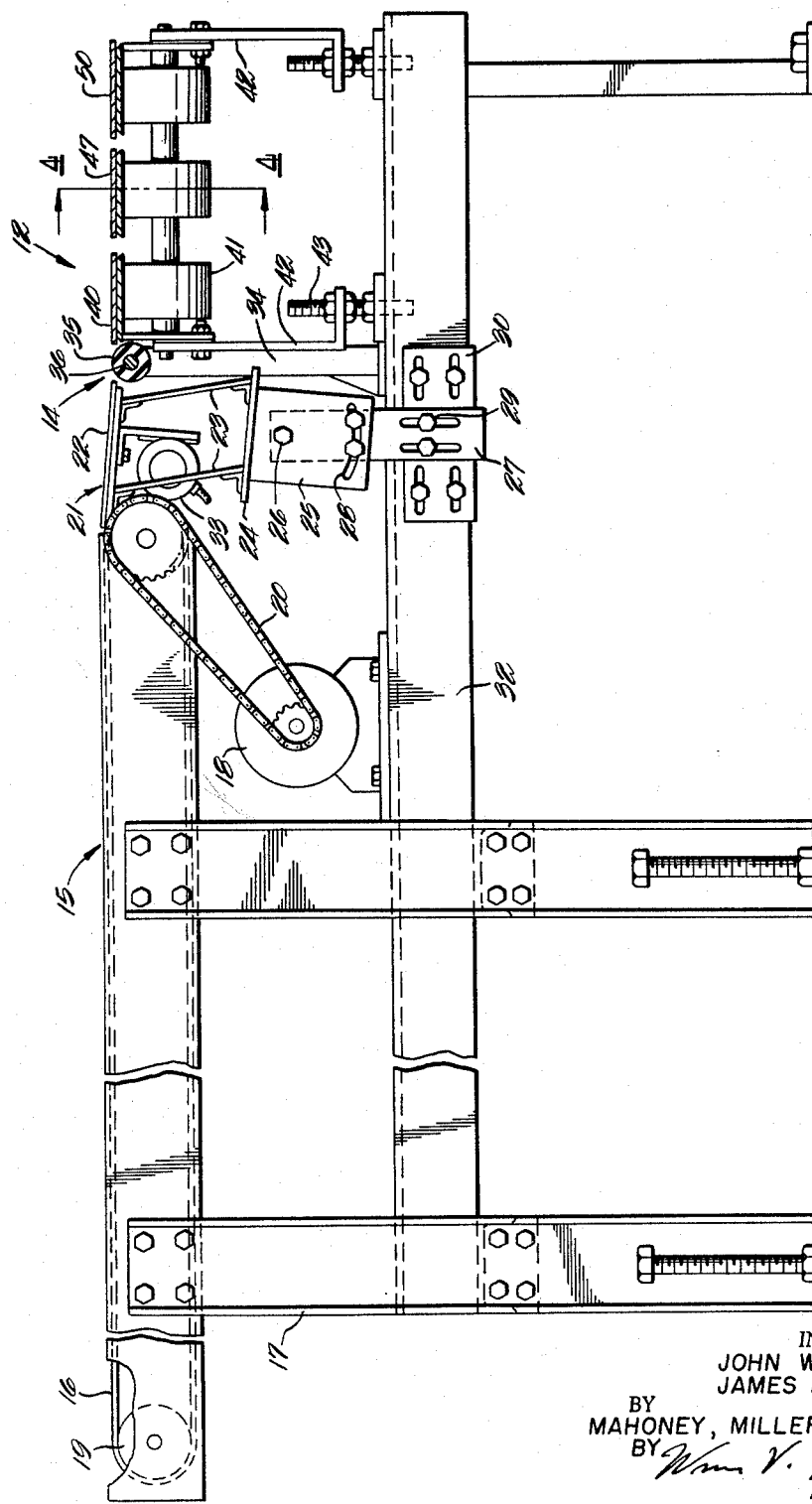

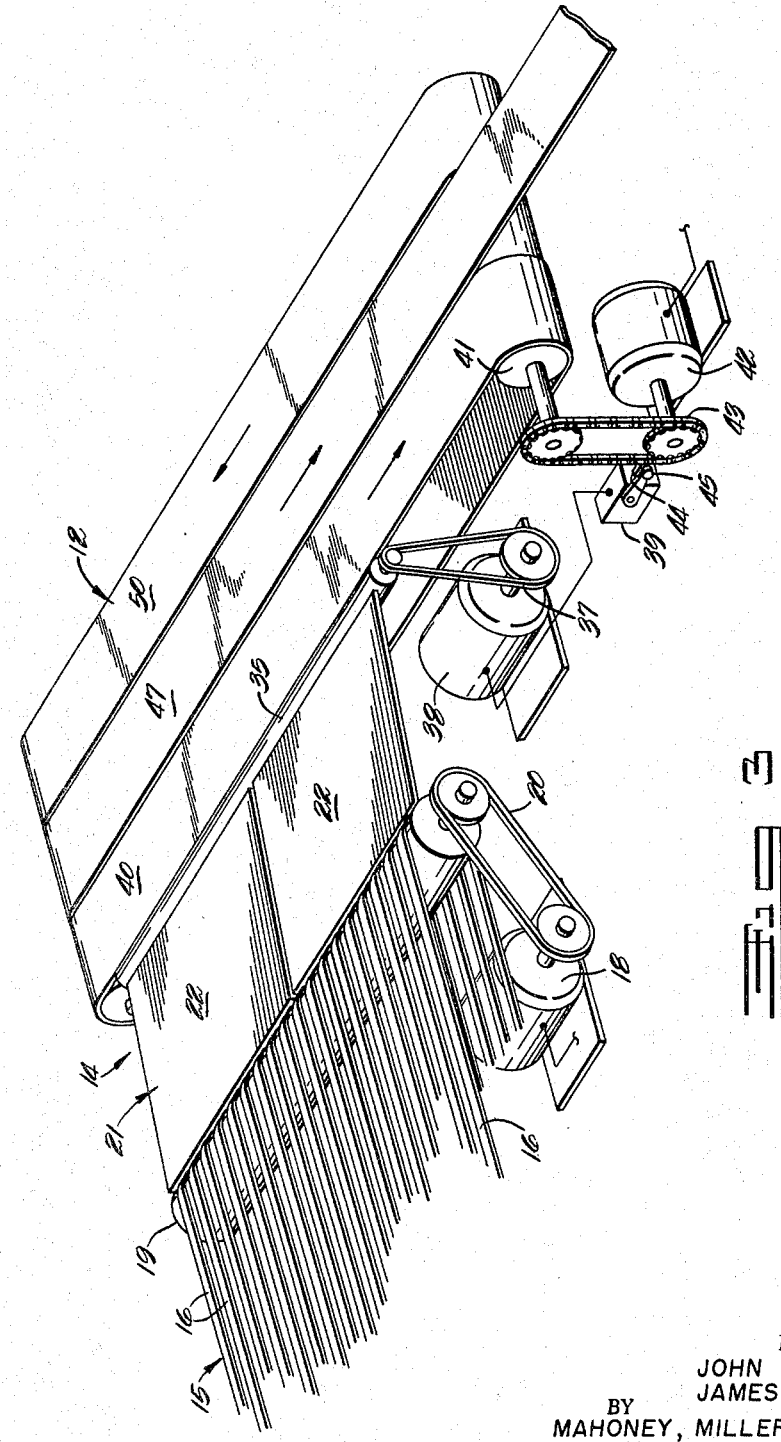

3,176,821
ARTICLE CONVEYING AND TRANSFERRING MECHANISM
John W. Eldred and James B. Legg, Columbus, Ohio, assignors to The Eldred Company, Columbus, Ohio, a corporation of Ohio
Filed Sept. 23, 1963, Ser. No. 310,767
12 Claims. (Cl. 198—20)

This invention relates to article conveying and transferring mechanism. It has to do, more particularly, with conveying mechanism for receiving indiscriminately positioned articles from a supply conveyor, arranging such articles in a straight line transversely of the supply conveyor and then transferring them as a straight line group onto a receiving conveyor in a line longitudinally of the receiving conveyor which is provided with means for equally spacing the articles of the row before feeding them to a machine which will perform some operation upon them.

For illustrative purposes, the mechanism of this invention will be described with reference to a glassware conveying and transferring mechanism which will feed the spaced articles into association with a glassware decorating machine. However, this conveying and transferring mechanism is capable of use with other articles and for feeding such articles into association with other types of machines.

In the attached drawings, an example of this invention is illustrated and in these drawings:

FIGURE 1 is a plan view of conveying and transferring mechanism embodying this invention, the articles conveyed being glassware articles which are conveyed into association with a decorating machine.

FIGURE 2 is a vertical sectional view taken along line 2—2 of FIGURE 1.

FIGURE 3 is a diagrammatic perspective view illustrating the article stop aligning and transferring mechanism of the apparatus.

FIGURE 4 is an enlarged detail in vertical section taken along line 4—4 of FIGURE 2.

FIGURE 5 is a diagrammatic plan view showing the articles being fed by the supply conveyor into cooperation with the roller-stop aligning and transferring mechanism.

FIGURE 6 is a similar view showing a row of articles aligned by the roller-stop.

FIGURE 7 is a view similar to FIGURE 6 showing a row of articles which have been aligned by the roller-stop and transferred thereby to the receiving conveyor as a row extending longitudinally thereof and being moved along by such receiving conveyor.

FIGURE 8 is a diagrammatic plan view illustrating another form of the present invention.

With reference to the drawings, in FIGURE 1 we have illustrated a glassware decorating machine 10 which will receive articles successively from a loader 11 that is supplied by a conveyor 12. This conveyor 12 has a screw feeder 13 associated therewith which also spaces the articles A of a single row successively. A single row of articles is supplied to the receiving conveyor 12 by means of an article aligning stop and transfer roller mechanism 14 which receives the articles indiscriminately from a supply conveyor 15, arranges them in a row transversely of the supply conveyor, and then supplies them as a row extending longitudinally of the receiving conveyor 12.

As previously indicated, this system is shown for the purpose of illustrating this invention but the invention is not necessarily limited to the supplying of glassware articles to a decorating machine. The decorating machine 10, the loader 11 and the spacer screw 13 may be of the type disclosed in the application of John W. Eldred and James B. Legg, Serial No. 274,195, filed April 19, 1963. The glassware articles A may be received by the supply conveyor 15 from a glass-forming machine or other source of supply. They are positioned indiscriminately on the conveyor 15. This conveyor may be of various types but is shown as comprising a series of laterally-spaced, endless belts 16 which are suitably carried on the upper end of a frame 17, by means of the longitudinally spaced rolls 19. This conveyor 15 is driven continuously by means of an electric motor 18 which drives one of the belt-supporting rolls 19 by means of a chain and sprocket drive 20. The driven roll 19 is preferably at the discharge end of the conveyor 15.

Disposed at the discharge end of the conveyor 15 and extending transversely thereof is a vibratory table 21 which includes a plurality of transfer plates 22, a pair of these plates being shown in end-to-end relationship and extending the full width of the conveyor 15, but any suitable number of plates can be provided. These plates are carried on the upper ends of flexible supporting bars 23 which are carried on a shelf 24 that is attached to upstanding plates 25. The plates 25 are disposed in laterally spaced planes which extend longitudinally relative to the conveyor 15 and are pivoted at 26 to the upper ends of upstanding supporting arms 27. A clamping bolt and arcuate slot arrangement 28 is provided between the plates 25 and the arms 27 to permit adjustment of the plates 25 about the pivots 26 and their retention in adjusted position. The lower ends of the arms 27 are mounted by means of clamping bolts and vertical slot arrangements 29 for vertical adjustment and retention relative to a horizontal bracket plate 30. These bracket plates 30 are attached by clamping bolt and horizontal slot connections 31 for horizontal adjustment and retention on the horizontal side beams 32 of the frame 17. Thus, it will be apparent that the position of the vibratory plates 22 may be accurately adjusted both vertically and horizontally as well as angularly relative to the horizontal. As indicated in FIGURE 2, these plates 22 are usually adjusted to a position where they will incline downwardly slightly from the discharge end of the conveyor 15.

The plates 22 are vibrated continuously by suitable vibrating elements 33 which may be suspended from the lower sides thereof. These vibrating units 33 may be of the usual electromagnetic type and are actuated continuously whenever the conveyor 15 is driven continuously.

According to this invention, we provide means associated with the vibratory table 21 for aligning the articles in a straight row at the discharge edge thereof and for conveying the row to the conveyor unit 12 which extends transversely of the supply conveyor 15. This means comprises an elongated roller 35 which is disposed along the discharge edge of the vibratory plate 22 and which extends transversely of the supply conveyor 15. This roller preferably includes a shaft 36 with a covering of rubber or friction material. The roller shaft 36 is mounted in supporting arms 34 attached to the beams 32 of the frame 17 and is driven from one end by means of a belt drive 37. This drive 37 runs from an electric motor 38. This motor 38 is controlled by a limit switch 39.

As indicated, the receiving conveyor 12 extends in a direction transversely of the supply conveyor 15. It comprises a variable speed endless belt 40 which moves transversely of the conveyor 15 and which has an edge extending along and parallel with the roller 35. The belt 40 is of the endless type and is carried by the rolls 41 which are supported by means of upright supports 42 mounted for vertical adjustment on the frame 17 by means of the screws 43. One of the rolls 41 is driven by means of a variable speed electric motor 42 through a timing drive 43. This timing drive is of the interengaging type, preferably being a chain and sprocket drive, although it can be of a timing belt type. The endless chain or timing belt carries a switch-actuating lug 44 for engaging the actuating trigger arm 45 of the switch 39 at proper intervals. The variable drive motor 42 will drive the chain continuously and, therefore, the switch 39 will be actuated at regular intervals to actuate the drive motor 38 for driving the roller 35. The switch 39 will be actuated only momentarily to thereby drive the roller 35 for a limited period only.

Directly adjacent the variable speed belt 40 another belt 47, which travels in the same direction, may be provided. This belt may be mounted and driven in a suitable manner but the details of this arrangement are not important to this invention. The belt 40 preferably will travel at a low speed relative to the belt 47.

The belt 47 has the screw 13 associated with one edge thereof and a guide rail 48 associated with the other edge thereof. Articles moved onto the belt 40 will be deflected by a guide rail 49 at the discharge end of the roller 35 and extending angularly across the belt 40 onto the belt 47. This rail 49 has a section 48a parallel with the rail 48 at the inlet end of the screw 13 for guiding the articles into association with the screw.

A third belt 50 traveling in a direction opposite to that of the belt 47 may be provided. This belt 50 may be supported and continuously driven in the reverse direction relative to the belt 47 by any suitable means, details of which are not important to this invention. The guide rail 48 has an end section 51 which extends laterally and rearwardly over the belt 50. With this arrangement, in case the articles are supplied too fast to the spacing screw 13, they will gang up at the inlet throat formed by the angled section of the rail 49 and the rail section 51 and will feed over onto the belt 50 which will take them to a suitable location for feeding again through the system.

In the operation of this system, the supply conveyor 15 will feed the articles A onto the vibratory table 21, as shown in FIGURE 5. The articles will vibrate across the vibrating plates 22 and stop when they contact the rubber-covered roller 35 which will project slightly above the level of the plates 22 and belt 40 between which it is disposed. At this time, the roller 35 will be stationary and, consequently, the articles A will be stopped and arranged in a straight row transversely of the conveyor 15 and along the discharge edge of the vibratory table 21, as shown in FIGURE 6. At this time, the lug 44 on the chain drive 43 will be in a position to actuate the trigger 45 of the switch 39 to momentarily cause the switch to energize the motor 38. This will momentarily rotate the roller 35 which will transfer the row of aligned articles onto the variable speed belt 40. The articles are transferred in a line extending longitudinally of the belt 40 and proceed in this line on the variable speed belt 40, as indicated in FIGURE 7, until they are guided from it to the conveyor belt 47 which feeds them to the spacing screw 13 which functions to equally space the articles before they are fed into the loader 11 (FIGURE 1) and eventually into the machine 10. When the last article passes the end of the roller 35, the roller is again activated and another line of articles is transferred onto the variable speed belt 40. Proper timing is accomplished by designing the length of the chain of the drive 43 to correspond to the distance that the variable conveyor belt 40 moves in order to clear the last article from the discharge end of the roller 35 before the following row is transferred by that roller onto the belt 40.

In FIGURE 8, a modification of this system is illustrated. A supply or first conveyor 15a is provided as before and is driven by an electric motor 18a. The discharge end of this conveyor is associated directly with the second or receiving conveyor belt 40a which is disposed at a right angle to the conveyor 15a and is driven transversely thereof by a motor 42a. In this instance, the vibratory plates are not provided but the elongated roller 35a is mounted directly in the space between the two conveyors. As before, the roller 35a is driven by a motor 38a. However, in this example the motor 38a is controlled differently. For this purpose, there is provided in association with the belt 40a a photoelectric system which includes a light source 44a, a photoelectric cell 45a, and a motor controller 39a. The source 44a projects a beam longitudinally of the belt 40a across the path of movement of the row of articles onto that belt which occurs each time the roller 35a is driven. This beam will be broken by such articles as long as any of such articles is on the belt 40a. As the belt 40a moves the articles, they are deflected from the belt by the guide member 49a. When all articles have cleared the belt 40a and, therefore, have cleared the roller 35a, then the roller is again driven since the motor 38a will be energized. As soon as the roller 35a transfers the row of articles onto the belt 40a, the beam of light is again broken and the motor 38a is deenergized.

It will be apparent from the above description that this invention provides a radially upwardly projecting roller transversely of the supply conveyor, between it and the receiving conveyor, which will move transversely of the supply conveyor. The roller will align articles supplied to it in the form of a row extending transversely of the supply conveyor. At the proper instant, this row of aligned articles will be transferred by the roller to the receiving conveyor, as a line extending longitudinally thereof, which will feed the row transversely of the supply conveyor and beyond it. When the row is clear of the roller, the roller will again be actuated to transfer the aligned articles from the supply conveyor to the receiving conveyor. On the receiving conveyor, the successively-transferred rows of articles will be moved into association with the spacing mechanism which will space succeeding articles of each row equally.

Various other advantages will be apparent.

Having thus described this invention, what is claimed is:

1. In combination, a conveyor for feeding articles in one direction, a conveyor for feeding articles in a direction at an angle to the first conveyor, and a roller disposed between the two conveyors, transversely of the first conveyor and longitudinally of the second conveyor, for stopping articles fed into contact therewith by the first conveyor and arranging them in a row for transfer onto the second conveyor, and means for rotating said roller to effect the transfer, said conveyors having article supporting, substantially horizontal surfaces and said roller projecting radially upwardly above such surfaces to a limited extent to stop said articles until rotated by said rotating means.

2. The combination of claim 1 in which said rotating means is controlled by the second conveyor.

3. The combination of claim 1 in which said rotating means is controlled by a photoelectric cell cooperatively disposed with the second conveyor.

4. The combination of claim 1 in which the first conveyor includes a vibratory table having an article-supporting surface, said table having one edge adjacent the article-supporting surface of the first conveyor and another edge spaced from the article-supporting surface of the second conveyor, said roller being disposed between said latter edge and the second conveyor.

5. The combination of claim 4 including means cooperating with the second conveyor for spacing the articles of a row transferred thereto.

6. In combination, an endless first conveyor having an upper run, an endless second conveyor having an upper run and being disposed at right angles to the upper run of the first conveyor, the discharge line of the upper run of the first conveyor being parallel to the adjacent edge of the upper run of the second conveyor with a space therebetween, a vibratory table in said space with one edge adjacent the discharge line of the first conveyor and with its other edge spaced from said edge of the upper run of the second conveyor, and a stop and transfer roller disposed in the space between the vibratory table and said edge of the second conveyor, said roller projecting slightly above said table and said upper run of the second conveyor, and means for rotating said roller at timed intervals.

7. The combination of claim 6 including variable means for driving said second conveyor, and means actuated by said driving means for controlling the rotation of said roller.

8. The combination of claim 7 in which the driving means includes an endless type timing drive, said means for rotating the roller including an electric motor, a switch for controlling said motor, and means carried by said timing drive for actuating said switch.

9. The combination of claim 6 including means cooperating with the second conveyor for controlling the rotation of said roller.

10. The combination of claim 9 in which said means for rotating the roller includes an electric motor, and said last-named means comprises a photoelectric cell in cooperation with said second conveyor for controlling said motor.

11. The combination of claim 9 in which said means for rotating the roller includes an electric motor, a switch for controlling the motor, said means cooperating with said second conveyor actuating said switch.

12. In combination, an endless first conveyor having an upper run, an endless second conveyor having an upper run and being disposed at right angles to the upper run of the first conveyor, the discharge line of the upper run of the first conveyor being parallel to the adjacent run of the second conveyor with a space therebetween, and a stop and transfer roller disposed in said space, said roller projecting slightly above said upper runs of the first and second conveyors.

References Cited by the Examiner

UNITED STATES PATENTS 1,472,679   10/23   Roddy _____ 198—105
2,812,051   11/57   Duckro _____ 198—105

SAMUEL F. COLEMAN, *Primary Examiner.*
WILLIAM B. LA BORDE, *Examiner.*